(12) United States Patent
Kall

(10) Patent No.: US 8,996,541 B2
(45) Date of Patent: Mar. 31, 2015

(54) SYSTEM AND METHOD FOR PROCESSING DATA RECORDS IN A MEDIATION SYSTEM

(75) Inventor: Johan Kall, Kirkkonummi (FI)

(73) Assignee: Comptel Corporation, Helsinki (FI)

( * ) Notice: Subject to any disclaimer, the term of this patent is extended or adjusted under 35 U.S.C. 154(b) by 134 days.

(21) Appl. No.: 11/916,786

(22) PCT Filed: Jun. 2, 2006

(86) PCT No.: PCT/FI2006/000175
§ 371 (c)(1),
(2), (4) Date: Sep. 16, 2008

(87) PCT Pub. No.: WO2006/131588
PCT Pub. Date: Dec. 14, 2006

(65) Prior Publication Data
US 2009/0030943 A1    Jan. 29, 2009

Related U.S. Application Data

(60) Provisional application No. 60/687,333, filed on Jun. 6, 2005.

(30) Foreign Application Priority Data

Jun. 6, 2005  (EP) ..................................... 05396019

(51) Int. Cl.
*G06F 17/30* (2006.01)
*H04L 12/24* (2006.01)

(52) U.S. Cl.
CPC .......... *H04L 41/069* (2013.01); *H04L 41/0226* (2013.01); *H04L 41/5003* (2013.01); *H04L 41/5029* (2013.01); *H04L 41/509* (2013.01); *H04L 41/5096* (2013.01)

USPC ......................................................... 707/752

(58) Field of Classification Search
None
See application file for complete search history.

(56) References Cited

U.S. PATENT DOCUMENTS 6,449,618 B1 *  9/2002  Blott et al. .................... 707/101
6,766,368 B1 *  7/2004  Jakobson et al. ............. 709/224
7,437,765 B2 * 10/2008  Elms et al. ..................... 726/26

(Continued)

FOREIGN PATENT DOCUMENTS

EP  0927932  7/1999
EP  1471 428  10/2004

(Continued)

OTHER PUBLICATIONS

European Search Report for 05396019.1, 9 pages.
(Continued)

*Primary Examiner* — Dinku Gebresenbet
(74) *Attorney, Agent, or Firm* — Faegre Baker Daniels LLP

(57) ABSTRACT

A mediation method and system utilizes a subsystem (300) for processing event records that at least potentially have a mutual relation. The subsystem comprises an in-memory database (410) capable of storing data, database interface layer (310) providing an interface to the database, a basic functionality layer (320) comprising at least one module capable of performing basic functions, and a mediation functionality layer (330, 340) comprising at least two modules each capable of performing at least one mediation function on the data in the in-memory database via the modules at the database interface layer and/or basic functionality layer.

31 Claims, 5 Drawing Sheets

(56) References Cited

U.S. PATENT DOCUMENTS

| | | | |
|---|---|---|---|
| 7,460,473 | B1 | 12/2008 | Kodama et al. |
| 7,860,762 | B2 | 12/2010 | Yi et al. |
| 7,984,336 | B2 | 7/2011 | Deleris |
| 2001/0001268 | A1* | 5/2001 | Menon et al. ............ 370/329 |
| 2002/0052754 | A1 | 5/2002 | Joyce et al. |
| 2002/0138559 | A1 | 9/2002 | Ulrich |
| 2003/0009443 | A1 | 1/2003 | Yatviskiy |
| 2004/0240648 | A1 | 12/2004 | Lilge et al. |
| 2005/0100149 | A1 | 5/2005 | Abbasi et al. |
| 2006/0045250 | A1 | 3/2006 | Cai et al. |
| 2007/0016907 | A1 | 1/2007 | Benedetti et al. |
| 2007/0180453 | A1 | 8/2007 | Burr et al. |
| 2007/0242816 | A1 | 10/2007 | Cai et al. |
| 2009/0215411 | A1 | 8/2009 | Tucker et al. |

FOREIGN PATENT DOCUMENTS

| | | |
|---|---|---|
| EP | 1517469 | 3/2005 |
| EP | 1761021 | 7/2007 |
| WO | WO 02/059754 | 8/2002 |
| WO | WO 02/103571 | 12/2002 |
| WO | WO 03/025809 | 3/2003 |
| WO | WO 2004/095326 | 11/2004 |
| WO | WO 2005/027409 | 3/2005 |
| WO | WO 2006/131588 | 12/2006 |
| WO | WO 2007/020499 | 2/2007 |
| WO | WO 2007/002577 | 4/2007 |
| WO | WO 2007/120598 | 10/2007 |

OTHER PUBLICATIONS

Wimmer et al. "Trends in Electronic Government: Managing Distributed Knowledge", Sep. 4, 2000, pp. 340-345, XP010515518, IEEE Expert 1098/8068/01.

Delic, K A et al. "Towards an Architecture for Real-Time Decision Support Systems: Challenges and Solutions", Jul. 2001, pp. 303-311, IEEE Expert 1098/8068/01.

Hausheer D. et al., "Design of a Distributed P2P-Based Content Management Middleware", Sep. 1, 2003, pp. 173-180, XP010657599, Euromicro Conference, 2003; Piscataway, NJ.

Openet Telecom; "Network-Edge Intelligence FusionWorks/ Mediation v4.1 Online!", Feb. 2005, p. 1, also available at www.openet.com/nlte_05.02.08.02.

Wiederhold, Gio, et al. "The Conceptual Basis for Mediation Services Cooperative Information Systems", Sep./Oct. 1997, pp. 38-47, IEEE Expert, 0885-9000197.

Wiederhold, Gio, "Mediations in the Architecture of Future Information Systems", Mar. 1992, pp. 38-49, IEEE Expert 008-916292/0300.

Chandra et al., "Dynamic Resource Allocation for Shared Data Centers Using Online Measurements," Lecture Notes in Computer Science, Springer Verlag, Berlin, DE, vol. 2707/2003, Jun. 2, 2003, pp. 381-398.

Abbleby K. et al., "Oceano-SLA Based management of a Computing Utility", IEEE/IFIP International Symposium on Integrated Networkingmanagement Proceedings, May 14, 2001, pp. 885-868.

International Preliminary Report on Patentability for Application No. PCT/FI2006/000175 (8 pages). This application is a 371 application of PCT/FI2006/000175.

* cited by examiner

SYSTEM AND METHOD FOR PROCESSING DATA RECORDS IN A MEDIATION SYSTEM

CROSS REFERENCE TO RELATED APPLICATION

This application is a U.S. nationalized patent application of PCT/FI2006/000175, filed Jun. 2, 2006, which claims priority to EP Patent Application No. 05396019.1 filed Jun. 6, 2005, and U.S. Provisional Patent Application Ser. No. 60/687,333 filed Jun. 6, 2005, the entire disclosures of which are hereby expressly incorporated by reference herein.

TECHNICAL FIELD

The present invention relates to a system and method for processing data records in a mediation system.

Mediation is a process wherein usage data is collected from telecommunication network and delivered to operator's Operation and Business Support System (OSS/BSS). Mediation software collects usage data from network by interfacing various different network elements. The mediation layer then aggregates, correlates, enriches, validates, formats, and/or rates the data so that it is readable by the target OSS/BSS system and it contains all the required information.

Mediation software hides the complexity of the network from the OSS/BSS system by ensuring that the data received by the OSS/BSS system is similar regardless of the network elements the data is coming from. That is, the OSS/BSS has to communicate only with the mediation software, not with several different kinds of network elements.

The present invention relates also to mediation methods and systems that have been developed in view of the requirements by handling events in new-generation solutions that are especially designed for continuous streaming mediation, which is also called real-time mediation. Mediation software installations in the past have been batch based, this being also the case with the majority of the installations at the time of filing this application. In a batch-based process, event records are collected in larger entities and processed after certain time intervals. Today new cases emerge that require data being collected, processed and delivered to the destination OSS/BSS as soon as the data is available in the network. Real-time mediation offers solution to this problem. One embodiment of this kind of solution is presented in FIG. 1.

Furthermore the presented invention contains a special arrangement for processing data records in a mediation system in scenarios where the processing of one record is depending on one or several other records. Examples of such mediation functionalities are aggregation, correlation, duplicate checking and enrichment.

BACKGROUND ART

Traditional event mediation solution contains functionalities like collection of usage data from network elements, aggregation, conversion of data format to unified format, correlation, etc. This all has been ready for years and most likely will be used for years to come.

Traditionally event mediation solution has been evaluated based on following technical criteria: how many network element interfaces it can support, what are the data formats it can read and produce, what is the processing performance of the system, what kind of process management functionalities it provides etc.

Only very rarely event mediation solution has been evaluated from business point view: how much money it can save, how much new revenue it can create, what are the new business models it enables, what kind of value-added information it can produce for operators business processes (e.g. customer care, billing, fraud, statistics).

Actually, business point of view was not very interesting, as billing models were simple and stable, and the source of the billing data was always known. Usage information was used also for other than billing purposes but the purpose and content of usage data was well known and well defined.

Shortly said: traditional event mediation is based on well-known sources of usage data, standard data formats, static billing models and relatively simple processing requirements. The main purpose of event mediation has been to collect data from the network, convert it to business support system format and deliver it to selected destinations.

Traditional event mediation solutions typically have dedicated separate modules for functionalities like aggregation, correlation and duplicate checking. While this works well for standard scenarios, legacy architectures are very inflexible when new functional requirements (that the solution has not been designed for) have to be met. This typically leads to vast changes in existing solution or even complete re-implementation.

The same applicant's former patent publication WO 2004/095326 presents an over all mediation environment suitable also for real-time mediation.

In US 2003/0009443 there is presented an aggregation method for data to be filtered, classified and applied by logical functions without data-specific instructions. This publication teaches one kind of solution for aggregating records in traditional mediation architecture.

DISCLOSURE OF INVENTION

It is an object of the present invention to create a new system and method for processing data records that at least potentially have a mutual relation.

The object of the invention is achieved by dividing the processing system and method into separate modules or parts providing different functions and using an in-memory database such that at least two of the modules or parts are capable of using the in-memory database via at least one of the other modules or parts.

According to one aspect of the invention, there is provided a subsystem for a mediation system and the subsystem comprises an in-memory database, a database interface layer, a basic functionality layer and a mediation functionality layer.

According to another aspect of the invention, there is provided a mediation system comprising a subsystem and a processing logic adapted to operate the subsystem. The subsystem comprises an in-memory database, a database interface layer, a basic functionality layer and a mediation functionality layer.

According to a further aspect of the invention, there is provided a method for processing at least potentially related event records in a communications network by means of a mediation system, which comprises a subsystem and a processing logic adapted to operate the subsystem. The subsystem comprises an in-memory database, a database interface layer, a basic functionality layer and a mediation functionality layer.

According to an aspect of the invention, there is also provided a computer program product stored on a computer-readable medium for configuring a computer system to form a mediation system comprising the above-described subsystem and a processing logic adapted to operate the subsystem.

According to an embodiment, each part of the subsystem has a particular task. According to a further embodiment, the subsystems operate in node applications.

According to an embodiment of the invention, the subsystem processes event records, which have a mutual relation, and performs operations called aggregation, correlation, combining and/or lookup.

According to an embodiment of the present invention, the mentioned operations are executed faster and in a more reliable way than in suchlike prior art solutions. This is achieved by a multi-layer processing structure of event records in a subsystem unit. In an embodiment of the invention the pre-processed event records are stored in an in-memory database where they are immediately available via different interfaces when another related event record is going to be processed with the stored one.

In an embodiment of the invention, the subsystem comprises interfaces between the layers. In an embodiment, each of the layers in the subsystem contains at least one module for performing a desired functionality characteristic to the layer. The expression "at least one module" means that any specific layer may contain exactly one module or several modules, for example two, three, four, five, six, seven or eight modules.

In an embodiment of the invention, the database interface layer comprises a module, which provides an interface to the in-memory database.

In an embodiment of the invention, the basic functionality layer comprises at least one module, which is capable of performing basic functions on the data in the in-memory database via the module at the database interface layer.

In an embodiment of the invention, the mediation functionality layer comprises at least two modules, each of which are capable of performing at least one mediation function on the data in the in-memory database via the modules at the database interface layer and/or basic functionality layer. Hence, the different modules performing different mediation functions are designed to use at least partly the same modules for the necessary basic functions. In a further embodiment, at least some of the different modules performing different mediation functions are designed to use the same in-memory database for the necessary storage functions. In the prior art, all of the modules have themselves and separately contained all these basic and storage functions. According to the embodiments of the invention, several basic functions can be shared.

As is apparent from the above disclosure, the present invention can be applied in a great variety of applications requiring fast and reliable processing of event records.

BRIEF DESCRIPTION OF DRAWINGS

For a more complete understanding of the present invention and the advantages thereof, the invention is now described with the aid of the examples and with reference to the following drawings, in which.

DEFINITIONS

Figure 1:
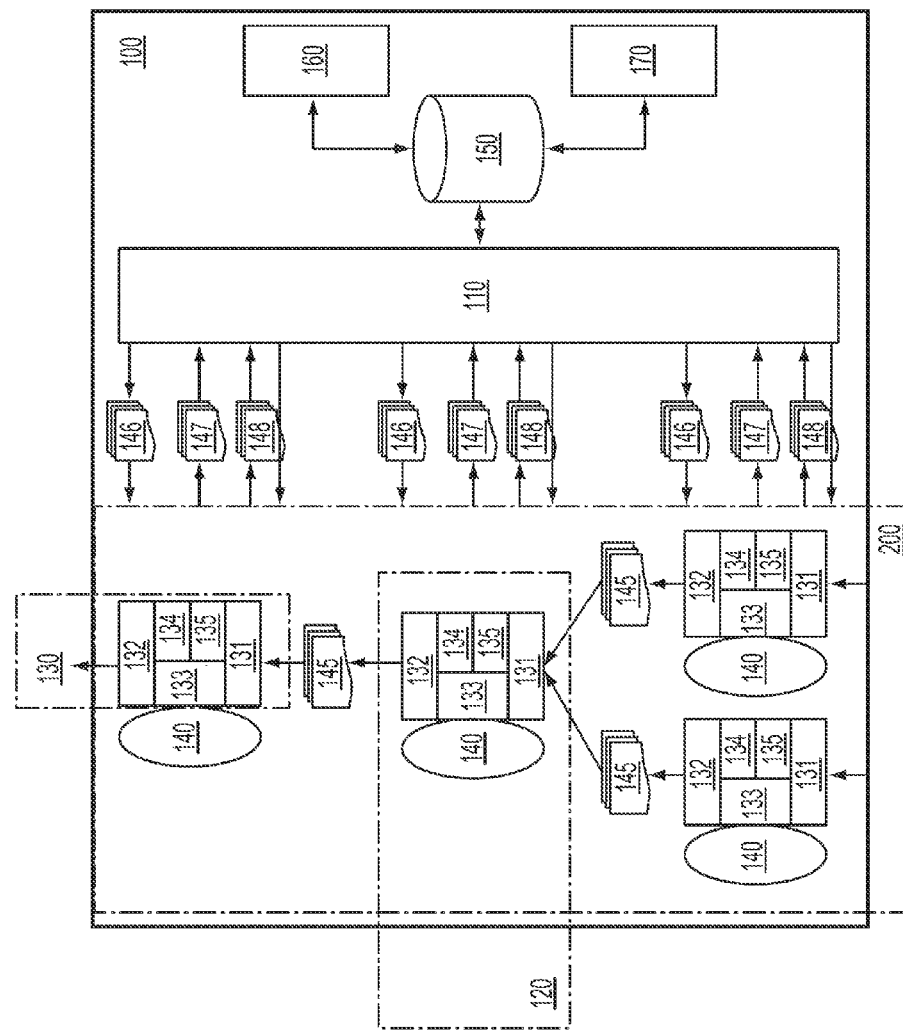
FIG. 1 presents a block diagram of an example of a prior art architecture and environment wherein an embodiment of the present invention is adapted to work.

Event: Event is a transaction occurring in a telecommunications network. Events are typically caused by actions taken by a subscriber while using telecommunication services. Events may also be based on actions taken by the telecommunication network or an apparatus connected to it, e.g. while executing telecommunications services. Some events may be even generated automatically while executing service programs and performing other functions for providing services to the customers.

Event Record: Event Record is a record that indicates that an event has occurred. That is, an event record provides information that a subscriber has used a telecommunications service. Event record contains also detailed information about the event. Hence, an event record may contain information on the usage, e.g. if the used telecommunication service is a phone call, the event record may indicate how long the call lasted, or if the service is downloading a file from an FTP server, the event record may contain information about the size of the transferred data block. Event records can be used for various purposes such as accounting, fraud management or statistical analysis. Event records can be produced, for example, by network elements or other systems. Event record is abbreviated as ER. Event records are sometimes called also as Call Detail Records (CDR).

Partial Event Record: Partial event record or partial record is an event record that describes a part of an event and does not contain the description of the whole event. In this case, two or more partial records are needed to describe the whole event.

Processing Logic: Rules, typically operator specific, according to which a system processes requests, events or event records and interfaces with external applications.

Aggregation: The function of grouping and joining together records, which are similar in format and come from one source (network element). Aggregation criteria (joined per day, per call, per . . . ) can vary. A specific case of aggregation is the combining of long-duration calls, which is based on flag and sequence number input by the switches.

Correlation: The function of joining together event records those are different in format and come from different sources, or joining the information of such event records. Correlation of event records is based on certain unique key fields that group together the event records to be correlated. Typically used key fields are IMSI, MSISDN, user name, and IP address.

Duplicate checking: The function of verifying if a processed item (e.g. record or file) has been already processed.

Sequence checking: The function of verifying that processed items (e.g. records or files) are processed in correct order.

Lookup: The function of using external reference data (lookup table) when processing event records.

Real time: Real time refers to passing event record through mediation system in streaming format. That is, as soon as a certain node in a mediation stream has processed (e.g. enriched) the record, it is passed to the next node. Pass-through time in a real-time system may be, e.g. from about 1 millisecond to 10 seconds. In some embodiments, events may pass through the system even faster. Sometimes, depending on the embodiment and application, the term real-time may also comprise pass-through times longer that stated above. In general, a real-time service is a service that does not include considerable delays such that a user of the service considers acts being taken and services provided essentially at the moment the services are ordered (i.e. events supplied to the mediation system).

Definitions of Number References Used in Figures

100 Host. A host is a physical computer or system where the mediation solution, or a part of the solution, works.

110 Node Manager. Node Manager is responsible for managing Nodes in the same host as it is running in. This includes starting up, shutting down, monitoring and configuring Nodes and collecting audit information from them.

120 Node. Node is an independent processing module. In the example of FIG. 1, Node comprises two parts: 'Node Application' and 'Node Base'.

130 Node Base. Node Base provides the basic standard functionality for the Node. It handles the internal usage data transmission mechanism between the Nodes and encodes the internal usage data. Node Base provides an interface to the Node Application for accessing the usage data and collecting customised audit information. It also communicates with the Node Manager for exchanging management, audit and configuration information.

131 Node Input Module. Node Input Module is responsible for reading the data from the internal input data sources, parsing it and passing the data to Node Application interface. Node Input Module uses Data Transmission Interface that defines the internal data format and data transmission mechanism.

132 Node Output Module. Node Output Module is responsible for reading the data from the Node Application Interface and encoding and writing it to Data Transmission Interface. Node Output Module uses Data Transmission Interface that defines the internal data format and data transmission mechanism.

133 Node API (Application Program Interface) Module. Node API Module provides the Node Application the access to the usage data. It 'hides' the internal data transmission interface from the Node Application. Node API includes functionality for providing the usage data to and receiving it from the Node Application. It is also used for retrieving customised audit information from the Node Application and for providing configuration parameters to it.

134 Node Configuration Module. Node Configuration Module is responsible for reading the configuration data from the Configuration Interface and for initialising the Node according to given configuration parameters. Node Configuration also passes Node Application specific parameters to the Node API Module. Node Configuration Module uses Configuration Interface that defines the configuration data format and transmission mechanism

135 Node Audit Module. Node Audit Module is responsible for writing various audit data to the Audit Interface. Node Audit Module defines content for audit interface. Node Audit Module uses Audit Interface that defines the default audit data format and transmission mechanism. Node Audit Module uses also Management Interface that defines monitored data format and transmission mechanism. This is used for example for indicating the status of the Node

140 Node Application. Node Application is responsible for altering the usage data in required manner. This includes processing functions like altering the data, filtering the data, aggregating and correlating the data. Node Applications are easy to implement for any data processing purpose. The Node Base enables development of Node Applications for example in C, C++, Java or Perl. Node Application communicates with the Node Base for retrieving the usage data from the internal data transmission mechanism or for sending usage data forward via the internal data transmission mechanism. Node Application also reports customised audit information about the usage data processing to the Node Base. If the Node is the first or the last Node in a Processing Stream the Node Application is also responsible for retrieving or sending the usage data from or to the required external interface. This includes encoding and decoding the usage data.

141 Processing Logic. Processing Logic contain the rules according to which a system processes requests, events or event records and interfaces.

145 Data transmission and buffering mechanism. Defines the usage data format and data transmission mechanism between the Nodes.

146 Configuration interface between Node Manager (process management system) and Nodes (processes). Defines the configuration data format and transmission mechanism from the Node Manager to the Nodes.

147 Audit data interface between Nodes and Node Manager for revenue assurance purposes. Defines the audit data format and transmission mechanism from the Nodes to the Node Manager.

148 Management interface between Nodes and Node Manager. Defines the Management Interface between the Nodes and the Node Manager.

150 System Database. Configuration, system monitoring and audit trail database. System Database contains configuration information and audit trail data for all the Nodes and Node Managers in the system. Information in the System Database is also used for the User Interface.

160 User interface. Graphical user interface. User Interface is used for configuring, managing and monitoring the system.

170 Application interfaces for integration and system maintenance. Interface that makes it possible to integrate different applications to the system: for example revenue assurance reporting tools etc. may comprise several different interfaces.

200 Processing Stream. Processing Stream comprises a series of Nodes. Typically a Processing Stream has Nodes for collection, processing and delivery. The number of Nodes is not limited. The number of Processing Streams in the system is not limited.

210 Collector Node. A network element or application server interface for usage data collection. A Collector Node receives the usage data either as files (batch mode) or event records (real-time mode).

220 Decoder Node. A node specialised in decoding certain types of event records, such as XML, log files or ASN.1, into a mediation solution internal data format for further processing.

230 Processing Logic Node. A node typically between decoder and encoder nodes that is specialised in a mediation function, such as validation, enrichment, correlation or conversion.

240 Encoder Node. A node that encodes the event records from a mediation solution internal format into a certain type of output data, such as ASN.1, XML or ASCII.

250 Distributor Node. A target system specific interface for event record delivery and sometimes formatting. The target system of a Distributor Node is typically an OSS/BSS system.

300 Multi-layer Record Storage. A subsystem used for storing and retrieving event records and the related data into an in-memory database.

310 Database Interface Layer. The database interface layer comprises a module, which provides an interface to the in-memory database.

320 Basic Functionality Layer. The basic functionality layer comprises at least one module, which is capable of performing basic functions on the data in the in-memory database via the module at the database interface layer.

321 Record Management. The record management module provides functionality to insert event record data into the storage, search for event record data present as well as retrieve and delete event record data from the storage. This means that whenever there is a requirement to store and search record data, this layer can be utilized, and there is typically no need to use the database interface layer directly.

322 Generic Lookup. During data processing it is sometimes necessary to enrich event records, which means that data from external systems, such as subscriber information, is combined with event record data. This is done by inserting or updating data in the event record according to a predefined set of keys and their return values. These keys and return values are maintained in a lookup table with columns and rows. Each column specifies a key or a return value and each row is represented by a combination of values for the keys and return values.

330 Generic Mediation Functionality Layer. The mediation functionality layer comprises at least two modules, each of which are capable of performing at least one mediation function on the data in the in-memory database via the modules at the database interface layer and/or basic functionality layer.

331 Generic Aggregation. Aggregation is a function creating summary records of sessions or calls according to predefined aggregation rules. Generic aggregation provides aggregation support functionality on top of which specialised aggregation schemes can be built.

332 Generic Correlation. Correlation is the function of joining together event records that are different in format and come from different sources, or joining the information of such event records. Specialised correlation schemes can be built on top of the generic correlation function.

333 Duplicate Checking. The function of verifying if a processed item (e.g. record or file) has been already processed.

334 Sequence Checking. The function of verifying that processed items (e.g. records or files) are processed in correct order.

335 Specialised Lookup. Specialised lookup allows e.g. a definition of search mode. It can e.g. be exact, longest, any or longest+any. The exact mode means that the search value must match with the key exactly. In the longest mode the key that has the longest matching substring is the match. The any mode is used if a match is not found. In such a case, the default value can be returned from the lookup table. The longest and any modes can also be combined in such a manner that the longest mode is used first and if no match is found, the default value is returned if it is present.

340 Specialised Mediation Functionality Layer. This layer is only present in case the mediation functionality layer has been divided into two sub-layers. Typical examples are aggregation and correlation where this layer extends the generic aggregation and correlation functionality provided by the mediation functionality layer.

341 Aggregation Schemes. Specialised aggregation functionality such as e.g. combining of long duration calls based on a sequence number in the incoming partial records.

342 Correlation Schemes. Specialised correlation functionality such as e.g. correlation of network access event records with service usage event records.

343 File-based Duplicate Checking. Specialised duplicate checking functionality that supports detection of duplicate files entering the mediation system.

344 Record-based Duplicate Checking. Specialised duplicate checking functionality that supports detection of duplicate records entering the mediation system.

345 File-based Sequence Checking. Specialised sequence checking functionality that supports detection of files entering the mediation system out of order.

346 Record-based Sequence Checking. Specialised sequence checking functionality that supports detection of event records entering the mediation system out of order.

410 In-Memory Database. The in-memory database capable of storing data on the event records that at least potentially having a mutual relation

411 An interface between a module at Database Interface Layer and In-Memory Database. Preferably this interface is SQL Interface. As the SQL interface is provided natively by the in-memory database, the same SQL interface is provided to the Database Interface Layer.

412 An interface between a module at Database Interface Layer and a module at Basic Functionality Layer. The database interface layer provides an SQL interface to the basic mediation functionality Layer.

413 An interface between a module at Generic Mediation Functionality Layer and a module at Basic Functionality Layer. The basic functionality layer interface offers functions to insert event records into the storage, search for event records present as well as retrieve and delete event records from the storage.

414 An interface between a module at Generic Mediation Functionality Layer and a module at Specialised Mediation Functionality Layer. The interface of the mediation functionality layer is specific to a certain mediation function. In case the specialised mediation functionality layer is not present, the processing logic utilises this interface directly.

415 An interface between a module at Database Interface Layer and a module at Generic Mediation Functionality Layer. In a preferred embodiment of the invention the Generic Mediation Functionality Layer (330) can utilize the Database Interface Layer Interface (412) directly when needed. In such an embodiment, there is no need for a separate interface 415.

416 An interface between a module at Database Interface Layer and a module at Specialised Mediation Functionality Layer. In a preferred embodiment of the invention the Specialised Mediation Functionality Layer (340) can utilize the Database Interface Layer Interface (412) directly when needed. In such an embodiment, there is no need for a separate interface 416.

417 An interface between a module at Basic Functionality Layer and a module at Specialised Mediation Functionality Layer. In a preferred embodiment of the invention the Specialised Mediation Functionality Layer (340) can utilize the Basic Functionality Layer Interface (413) directly when needed. In such an embodiment, there is no need for a separate interface 415.

421 An interface between Processing Logic and a module at Database Interface Layer. In a preferred embodiment of the invention the Processing Logic (141) can utilize the Database Interface Layer Interface (412) directly when needed. In such an embodiment, there is no need for a separate interface 421.

422 An interface between Processing Logic and a module at Basic Functionality Layer. In a preferred embodiment of the invention the Processing Logic (141) can utilize the Basic Functionality Layer Interface (413) directly when needed. In such an embodiment, there is no need for a separate interface 422.

423 An interface between Processing Logic and a module at Generic Mediation Functionality Layer. In a preferred embodiment of the invention the Processing Logic (141) can utilize the Mediation Functionality Layer Interface (414) directly when needed. In such an embodiment, there is no need for a separate interface 423.

424 An interface between Processing Logic and a module at Specialised Mediation Functionality Layer. The interface of the specialised mediation functionality layer is specific to a certain mediation function. This is typically the interface that is offered to the processing logic.

501 Read input record from Node Base 130.
502 Check is it a partial record.
503 Check whether there are other partial records existing.
504 Check whether is possible to combine the partials.
505 Combine the partials.
506 Check whether a record is complete.
507 Add record to storage (In-Memory database 410).
508 Construct output field values.
509 Send an output record to further processing.
510 Proceed to next input record.

BEST MODE FOR CARRYING OUT THE INVENTION

According to one embodiment of the invention, there is provided a subsystem for a mediation system that processes event records. In the embodiment, the subsystem is intended for processing event records that at least potentially have a mutual relation. An example of a mutual relation between event records is a long call combining situation, wherein the mutually related event records relate to the one and same call. An example of a potential mutual relation between event records is a duplicate checking situation, wherein the event records are checked for duplicates. In case duplicate records are found, the records have a mutual relation. If there is no duplicate for a given record, there was not a mutual relation with another record but the record was processed because of a potential mutual relation. Hence, the subsystem processes event records at least potentially having a mutual relation.

According to the embodiment, the subsystem comprises:
an in-memory database 410 capable of storing data on the event records at least potentially having a mutual relation,
database interface layer 310 comprising a module providing an interface 411 to the in-memory database 410,
a basic functionality layer 320 comprising at least one module 321, 322 capable of performing basic functions on the data the event records in the in-memory database 410 via the module at the database interface layer 310, and
a mediation functionality layer 330, 340 comprising at least two modules 331, 332, 333, 334, 335, 341, 342, 343, 344, 345, 346 each capable of performing at least one mediation function on the event records data in the in-memory database 410 via the modules at the database interface layer 310 and/or basic functionality layer 320.

According to another aspect of the invention, there is provided a mediation system comprising the above-described subsystem. The mediation system also comprises a processing logic 141 adapted to operate the subsystem for the processing of event records.

One attractive application of the above described subsystem is to use it in a mediation system described below, which provides a new-generation mediation solution that has been especially designed for real-time handling of event record streams. These mediation solutions are presented in FIGS. 1 and 2. For a more complete understanding of such systems, the reader is urged to consult International Patent Application Publication WO 2004/095326, which is incorporated herein by reference. In such a system, at least one of the node components can be provided with a subsystem according to an embodiment of the present invention. The subsystem is suitably located in a Node Application 140. Also the processing logic 141 adapted to operate the subsystem can be located in the same Node Application 140.

In such a system, usage data can flow through the mediation solution as individual event records, which are passed to billing, traffic engineering, network planning, balance management, fraud detection and/or other OSS/BSS systems. The OSS/BSS systems can be sure that their operations are based on accurate real-time information. The billing system receives event records from the mediation solution in an instantly billable form. The mediation solution allows various charging options; billing can be based for example on volume, content value, QoS (Quality of Service) or time, or any combination of these. The mediation solution enables charging of content and MMS services (Multimedia Messaging Service) by being capable of transmitting usage data for example from MMSC (Multimedia Messaging Service Centre), content proxies and application servers. It enables also usage-based billing of VPNs (Virtual Private Network) and Internet connections, allowing for example charging on the basis of QoS and bandwidth.

Real-time information allows OSS/BSS systems to see in real-time what individual subscribers are doing and how the network is being used. This information can be analysed to find more competitive tariff structures and reduce customer churn. It can also help in depicting end-user characteristics and planning how to better serve individual customers. Functions such as balance management for customers' cost and credit control and fraud detection can use the information for controlling service usage.

The mediation solution according to the embodiment has been designed to interface with any network and to serve any OSS/BSS system. It can be used for both packet and circuit switched networks by all types of operators including 2G, 2.5G, 3G, IP, fixed-line and satellite network operators as well as service operators. It provides numerous off-the-shelf standard and proprietary interfaces to different OSS/BSS systems. The mediation solution can handle any type of records generated by different types of network elements. Furthermore, the embodiment can handle and process these records despite differences in their structure.

Features and Benefits of an Embodiment

In the following, arguments are presented for the profitability of a solution according to an embodiment of the invention, together with presentation of some of the novel features of the embodiment.

Vendor Independence—Focus on Performance and Cost-Efficiency

With complex network and business support systems (in a multiswitch/system type of environment), it is beneficial to be able to make cost and performance comparisons between different players. The embodiment enables a vendor independent choice. Operators and service providers need to consider the performance and cost-efficiency. Due to these points, the mediation solution can be easily updated in a highly complex, multi-vendor environment. Adding new network element and OSS/BSS interfaces is fast, which allows rapid and cost-efficient launching of new services.

Ability to Create a Best-of-Breed, Convertible Customer Care and Billing System

A mediation device according to the embodiment is truly independent from any network element and billing system vendor. The mediation solution is capable of collecting data from any network (3G, 2.5G, 2G, IP, fixed line or satellite) or service platform and of delivering it to any Operations or Business Support System—regardless of operators' or service providers' network or OSS/BSS vendor.

High Performance

In a typical configuration of the system, the event records are processed in a pipeline architecture, wherein all mediation functions are executed simultaneously for different records of the event record flow. This, combined with the core event record processing executed in programs written in a low-level programming language, ensures very high records per second throughput.

Modular Software—Quick and Reliable Time-to-Market

The solution according to the embodiment comprises tested and proven modules. Operator's particular solutions can be introduced in a quick and reliable manner. The mediation solution is a packaged software product that can be implemented in a considerably shorter time than tailor-made solutions. In addition to quicker implementation, an off-the-shelf product allows easier and more cost-efficient maintenance and usage.

Reliability

The mediation solution according to the embodiment has a straightforward architecture, which is based on well-proven technologies. The functional structure is based on totally new elements for processing events in an inventive environment. The processes can function independently of each other and the managing system. All data is buffered for any kind of error and system overload situations.

The system is designed so that there is no single point of failure, e.g. a common process for handling the event record transferring from one node to another. This means that as long as the host server is running, and there is free space in the host's file system, the event record processing is not interrupted.

Real-Time Network Usage Information

A real-time mediation solution provides operators' and service providers' OSS/BSS systems with instant information about subscribers' current network usage. Real-time information is vital for many operations such as network planning, traffic engineering, balance management and fraud detection. Further, having a real-time mediation solution offers various benefits to operators. Real-time usage information helps OSS/BSS systems to make operator business more profitable and increase customer satisfaction.

With the mediation solution according to the embodiment, charging can be based on content value, QoS, volume, bandwidth or time, or any combination of these. The mediation solution enables billing of MMS and IP services by being capable of transmitting usage data for example from MMSC, content proxies, application servers and probes. The mediation solution can handle any type of records generated by different network elements independently of used record type. This so-called free record type handling is recognized and handled by configuration of the mediation solution described later in this document.

Configurability

Users can define freely which processes to include in a mediation process stream. There can be several process streams functioning concurrently. Each process is fully configurable, making it possible to define accurate rules for usage data handling. The order of the mediation processes is fully configurable and same processes can be multiplied if needed.

The configuration of the process streams can be done without disturbing the ongoing processing, and the user can decide when to activate the changes into the configuration. The version control of the configurations allows returning to an earlier working configuration version in case of problems.

An Example of an Environment of Embodiment

The keywords of the mediation solution architecture are simplicity and straightforwardness. The modular design of the solution according to an embodiment of the invention enables real-time and distributable processes, reliable operation and high performance.

The mediation solution comprises mediation processes, managers controlling the processes, system database and web-based user interface. Mediation processes such as collection, analysis, correlation and conversion are linked together to construct processing streams. Streams are fully customisable and there can be multiple streams simultaneously active.

All processes are controlled by process managers, which start up, monitor, stop and configure them when so instructed. This is presented in FIG. 1. Managers give configurations to the processes during start-up. Once started, the processes can function independently from the manager, also in case the manager is temporarily unavailable.

Unlike the batch processing methods, which process the files in turns, the new architecture is an "always on" architecture, wherein, in the best case, all the processes are doing work simultaneously (pipeline architecture).

A single functionality, like processing call data from all network elements and forwarding it to the billing system, is usually done in a single processing stream, unlike in traditional mediation solution in which there is one batch processing method for each network element.

Node (Mediation Process)

Nodes 120 are functional components specialised in different mediation processes, such as collection, aggregation, validation, correlation and formatting, or a combination of these. Nodes are linked together to form processing streams for event record handling. Each stream 200 is fully configurable through the web user interface of the mediation solution according to the embodiment.

Nodes 120 run independently of each other. This means that even if one of them is temporarily unavailable, the other nodes continue as before. This, in addition to their independence from the manager 110, adds to the reliability of the system. Also, any data that cannot be transferred from one node to another, due to for example a network failure, is buffered.

Some of the properties of a node are:
- Totally independent of the controlling process, i.e. if the controller goes down unexpectedly, the event record processing will continue.
- Always on: after the controller has started the process, it will not end until the controller stops it
- Scans event records for processing from the source(s) designated by the controller.
- Writes the output records to the destination(s) designated by the controller.
- Writes revenue assurance etc. reporting data at regular intervals to a place designated by the controller
- Sends heartbeat signal to the controller indicating that the node is alive.

Special nodes, like a collector node, can have following special attributes and features:
Timing of the sending of records for further processing: time-based intervals for streaming collectors for forwarding data in larger record blocks for improved throughput.
Scheduling file-based collection or delivery process—the node itself handles the scheduling.

System Database

System database 150 stores node configuration, audit trail information as well as status information of nodes 120, streams 200 and Node Managers 110. Also orders for Node Managers 110 are stored within the system database 150.

Typically, the system database 150 is viewed, updated and maintained with the user interface 160 or the command line system tools, but external systems 170 can also connect to the mediation solution and access the system database 150.

System database 150 should be separated from the in-memory database 410, which is one component of an embodiment of the invention.

The presented environment system comprises the following separate parts:

1. System Database 150 and User Interface 160 for centralized management of the system.
2. Node Manager 110, which controls chained data processing applications 140 within a host 100
3. Node Base 130, which gives the basic functionality for various data processing applications 140
4. Applications 140, which contain customized processing logic for processing event records.

FIG. 1 illustrates the presented system environment, the real-time processing architecture on high-level. The architecture comprises Node Managers 110 that control a number of Nodes 120 residing within the same physical host 100. The Node Manager(s) 110 have an interface to a System Database 150 that is used for storing various configuration and audit trail information. The User Interface also interfaces with the System Database. The solution uses file-based interfaces for transferring usage data between the Nodes 120 and for communication between the Nodes 120 and the Node Manager 110.

The following high-level interfaces are identified within the system:
D=data transmission and buffering mechanism 145
C=configuration interface between Node Manager (process management system) and Nodes (processes) 146
A=audit data interface between Nodes and Node Manager for revenue assurance purposes 147
M=management interface between Nodes and Node Manager 148
API=application interfaces for integration and system maintenance 170
DB=configuration, system monitoring and audit trail database 150
UI=user interface 160

When the system is distributed to several hosts 100, each host has its own Node Manager 110 that controls the Nodes 120 within the host. For clarification, the hosts 100 can be situated in anywhere in the world. For instance, an operator may have several networks in different countries or even continents. In these cases it is recommended to set at least one host to each country or continent. This minimizes the flow traffic over intercontinental transmission lines and makes the system efficient and more reliable.

Each Node 120 has standard functionality that provides automated data transmission mechanism between the Nodes and processing information logging mechanism between the Node and the Node Manager. The actual usage data processing logic is implemented by different applications 140 that reside in the Nodes. These applications 140 are isolated from internal data transmission mechanism and internal data formats enabling easier application development. Applications 140 are drawn as ovals in the FIG. 1 presented. The system provides a standard interface through which the applications communicate with the processing framework.

Figure 2:
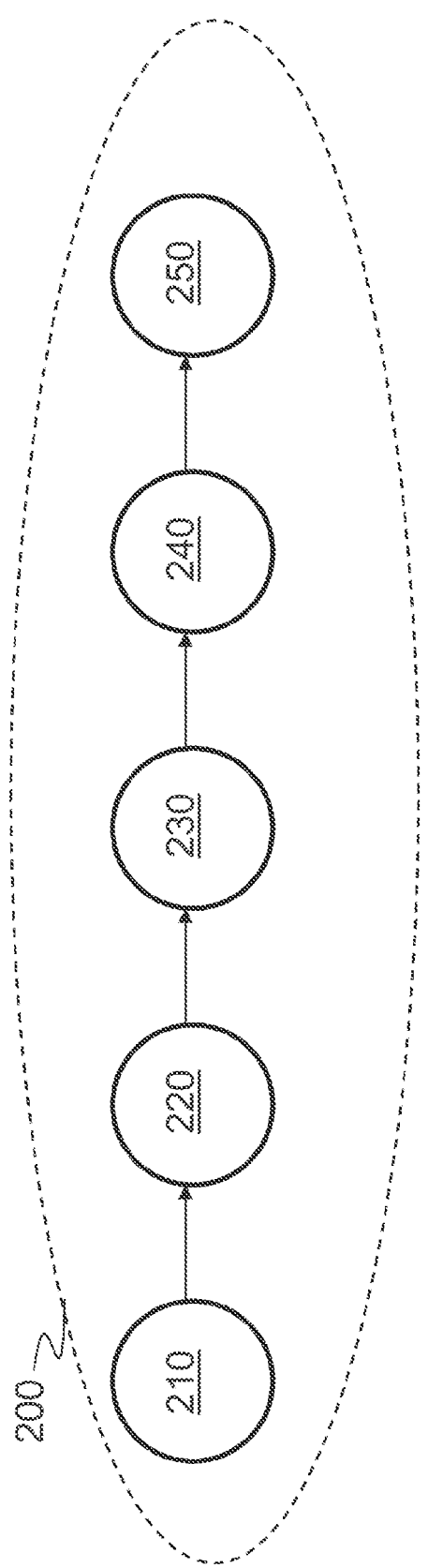
FIG. 2 presents a block diagram of one processing stream of a mediation system in functional level.

FIG. 2 presents one kind of real-time mediation system. The process starts when Collector node 210 collects event records from e.g. network elements (not shown). Before the actual processing the collected records have to be decoded in suitable format in Decoder node 220. The actual processing of event records is executed in Processing Logic node 230. According to an embodiment of the invention the preferable operations are for instance: aggregation, correlation, duplicate checking, sequence checking, lookup, etc. When all operations are completed the output records are encoded in Encored node 240. The encoded records are distributed by Distributor node 250 for other systems' use (e.g. OSS/BSS).

Functionality of an Embodiment

Mediation includes different processes like collection, validation, enrichment, aggregation, correlation, rating, conversion and delivery. The varied functionality allows OSS/BSS systems to receive usage data just as they want it.

Some of the main functions of a mediation solution according to an embodiment of the invention are described below. Each of these functions is configurable.

Collection

The mediation solution according to the embodiment is capable of interfacing with any network—e.g. 3G, 2.5G, 2G, IP, fixed line or satellite—or content and services platform—or any combination of presented network technologies. It collects the event records from the network as continuous real-time stream or as files.

Validation and Analysis

When receiving event records from the network, the mediation solution checks them for duplicates and verifies their sequence. By doing this, it ensures that the numerous event records stream into the system in correct order and that none of them is missing or delayed or tries to enter the system for the second time.

After collection, the mediation solution carefully examines and analyses the contents of the event records. It checks that all values included in the event record fields are applicable and in a correct format. It can join fields and insert additional values to them when necessary.

Lookup—Enrichment

The mediation solution according to the embodiment is able to enrich event records by completing them with information from external sources. It can, for example, fetch the information on which customer category a specified service user belongs to, and add this information to the event record. Marking of customer category helps other processes such as billing.

Aggregation

In aggregation, the mediation solution according to the embodiment merges partial event records produced by a single service usage and coming from the same network source. Aggregation thus allows the OSS/BSS systems to receive only one billable record from each service usage. A special scenario for aggregation is combining of long duration calls. For a long duration call, a network element typically generates event records (ERs) at regular intervals. The aggregation process combines all received partial records into one event record.

Correlation

Correlation involves combining event records also, but the records to be correlated come from different sources. A GPRS session, for example, produces S-CDRs (Call Detail Record) in SGSN and G-CDRs in GGSN that the mediation solution is able to correlate into one output record. The correlation process is typically divided into three phases: 1) Identification (rules that determines how to group records together), 2) Fetching (rules that determines when grouped records are ready for processing) and 3) Correlation (rules that determines how the resulting output records are created from the input records in a group).

In an embodiment of the invention the identification is a process of linking together records that are to be correlated. The identification is made using certain key fields in the records, which may be for instance matching field values exactly or using a defined tolerance.

Furthermore in second phase the fetching is the process of determining when a group with related records is complete and ready for the actual correlation process. To achieve real-time correlation, fetching can be triggered immediately after identification. In the last phase the correlation is the process of creating the output records from the related input records in a group. The correlation rules define how certain values in the input records are transferred to the output records. The number of output records that result from a correlation process varies depending on the correlation scenario.

The records to be correlated may come at the same time from access network and content platform, which is the case in a content usage session. The mediation solution then completes the event records from content platform with the user identification fetched from access network. The correlated records contain all the information needed for content charging: who the user was, what services he used and for how long, as well as the value of the services.

Rating

The rating functionality of the mediation solution according to the embodiment allows pricing of event records in the mediation system. Flexible rating criteria and various pricing models can be used as rating bases. Also subscriber specific rating is possible.

The rated event records can be sent directly from the mediation solution to balance management and other applications without any intervention from billing system.

Formatting

Before delivering the fully processed event records to the OSS/BSS systems, the mediation solution according to the embodiment converts them to formats compatible with these systems. The mediation solution is able to convert the records either to a standard format or to operators' proprietary formats. Due to conversion, an OSS/BSS system receives all usage information from the network in a uniform, predefined form. It should be noticed that the formatting of event records might be done also in any point or points through the processing stream of the mediation process.

Delivery

The mediation solution according to the embodiment is able to simultaneously interface with multiple different OSS/BSS systems. Even if it performs all its collection and other processes in real-time, it is able to deliver the processed records to the OSS/BSS systems either through a configured real-time protocol or a file interface.

Architecture of a Mediation Subsystem According to an Embodiment

Figure 3:
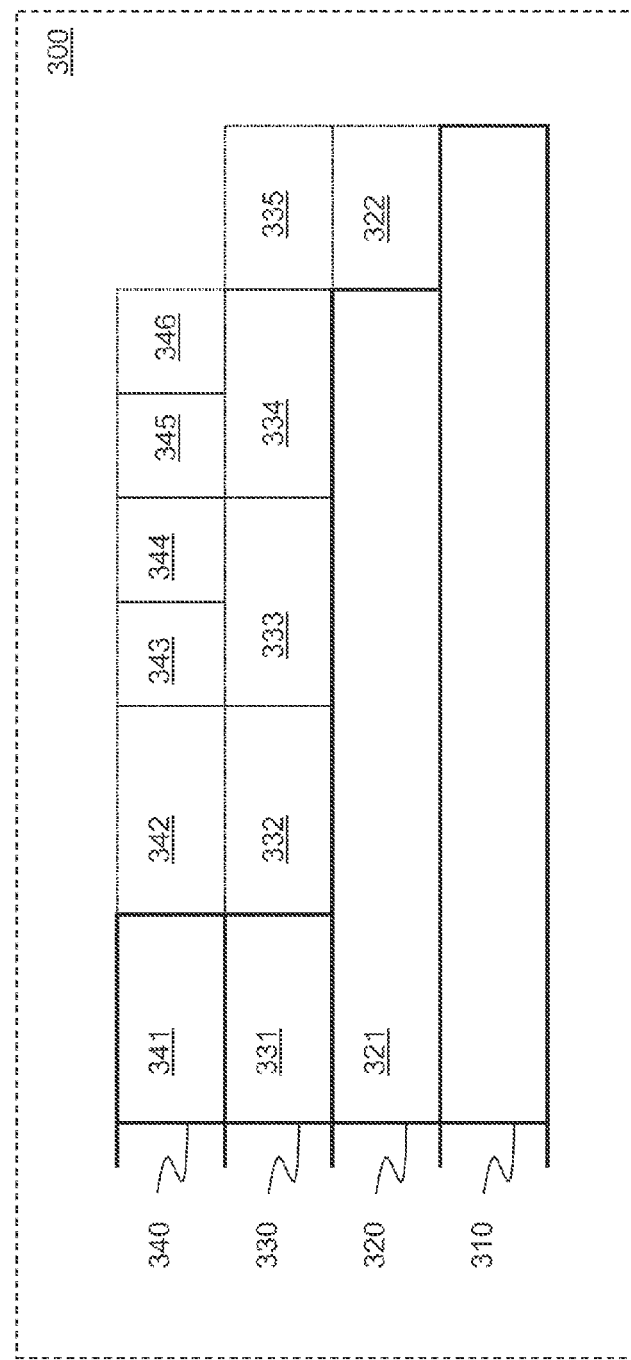
FIG. 3 presents a block diagram of a framework according to an embodiment of the invention.

The presented multi-layer record storage 300 aims to overcome the limitations of the legacy solutions by offering a common architecture on top of which this kind of functionality is built. FIG. 3 describes an embodiment of the invention wherein several mediation-related specific functions such as aggregation, correlation, sequence checking, duplicate checking and lookup are presented.

An embodiment of the invention is a multi-layer solution. The reason for this approach is that there are certain common elements in this problem area. These common elements are for instance following: Data needs to be stored for a short time period (typically hours). Furthermore, data needs to be easily accessed and maintained. Also the processed event records have different origin and therefore they are multiform. The most common requirement is to store event records (ERs), but it must be possible to store other kinds of information as well. These can be e.g. external reference data for lookup purposes and key values (very similar to normal ERs, but less complex) for duplicate and sequence checking.

Furthermore, some functions in the problem area have more in common (e.g. support for different kinds of aggregation scenarios), while e.g. aggregation and duplicate checking differ more. Finally new challenges are faced constantly. This means that the solution has to be easy to extend, using as little effort as possible.

A preferred embodiment of the invention comprises of multi-layer solution wherein the lower layers 310, 320 have very generic and limited functionality. Higher layers 330, 340 provide more functionality that is specific to a purpose. The lower layers are generic and same to all higher layers functionalities. In an embodiment of the invention, depending on the operator requirements, the person that configures the system has multiple options to use a high layer directly, which is very efficient and a need for customisation requires very little work. Another alternative is to use a lower layer, which gives basic record handling functionality, but requires some work for operator specific functionality. Another alternative is to implement a new high layer on top of an existing layer. This requires some work, but once done properly, the functionality can be re-used for later deployments.

The following sections describe the different layers and the reasoning why each layer is present.

Layer 1—Direct SQL Interface Module at the database interface layer 310

This kind of solution requires a high performance database 410. Due to the high performance requirements (thousands of interactions per second) a memory-based solution is seen more suitable than a traditional disk-based database.

As the SQL interface is provided natively by the in-memory database, the same SQL interface is also provided to the configurable processing logic 230. The reason for this is to ensure that there are no limitations in terms of functionality. All functionality provided by the SQL database is available to the configurable processing logic, if needed.

In case the functionality of a higher layer does not support certain functionality, this module at the database interface layer can be utilized directly.

Example SQL statements:
SELECT—Retrieves entries from a table
INSERT—Adds one or more new entries into a table
UPDATE—Modifies the data in existing table entries
DELETE—Removes existing entries from a table Layer 2—Generic record storage and retrieval module 321 at the basic functionality layer 320

As also stated above: The main purpose of the multi-layer record storage 300 is to handle all mediation scenarios in which the processing of one record is dependent on one or several other records. The above statement alone indicates that the solution has to support easy handling of event records for different purposes. I.e. this layer extends the basic SQL layer, as it is 'aware of event records'.

In an embodiment of the invention, the record management module 321 handles all basic functionalities for event records. An event record of a defined type contains a defined set of data fields. This layer allows the user to insert event records into the storage, search for event records present as well as retrieve and delete event records from the storage. This means that whenever there is a requirement to store and search records, this layer can be utilized, and there is typically no need to use the SQL module at layer 310 directly.

This is the layer on top of which most of the mediation functionality is built.

The generic record storage and retrieval module supports functions like:
 Store a record with a set of data fields
 Search for records according to given keys
 Retrieve records according to given keys
 Update records according to given keys
 Delete records according to given keys
 Rollback changes to previous store point. This is important as the architecture of a mediation solution guarantees that event records are never lost nor duplicated. In case an error occurs, it has to be possible to revert back to the previous "safe" store point.

This layer also provides generic lookup function in a lookup module 322. Generic lookup means that data from external systems, such as subscriber information, is combined with event record data. This is done by inserting or updating data in the event record according to a predefined set of keys and their return values.

Layer 3—Generic Functionality Modules 331-335 at the Mediation Functionality Layer 330

This layer is already specific to a certain mediation function. These functions are for instance generic aggregation 331, generic correlation 332, duplicate checking 333, sequence checking 334 and specialised lookup 335. If taking aggregation as an example. The typical characteristics of aggregation are as follows:
 Summary records from a number of related input records are created
 The related records that are summarized can be identified using a unique identifier that is present in the incoming records
 Standard rules are applied to certain fields: sum, min, max, average, concatenate, etc.

Layer 4—Specialised functionality modules 341-346 at the mediation functionality layer 340

This layer extends the generic function of layer 3. There are e.g. different kinds of aggregation schemes 341:
 Combining of long duration calls using sequence number. Basic aggregation rules 331 of layer 3 are used, but this layer is able aggregate records in correct order based on the timestamp of the incoming records. It is also able to determine when a record is complete by taking into account a "partial record indicator" field that tells if an input record is the first, intermediate, or last part of a long duration call.
 Similar to the above, but order of aggregated records is based on a sequence number instead of a timestamp.

The other specialised functions presented in the FIG. 3 are: Correlation schemes 342 (likewise aggregation schemes, but dedicated to correlation function), File-based Duplicate Checking 343, Record-based Duplicate Checking 344, File-based Sequence Checking 345 and Record-based Sequence Checking 346.

Interfaces of an Embodiment of the Invention

Figure 4:
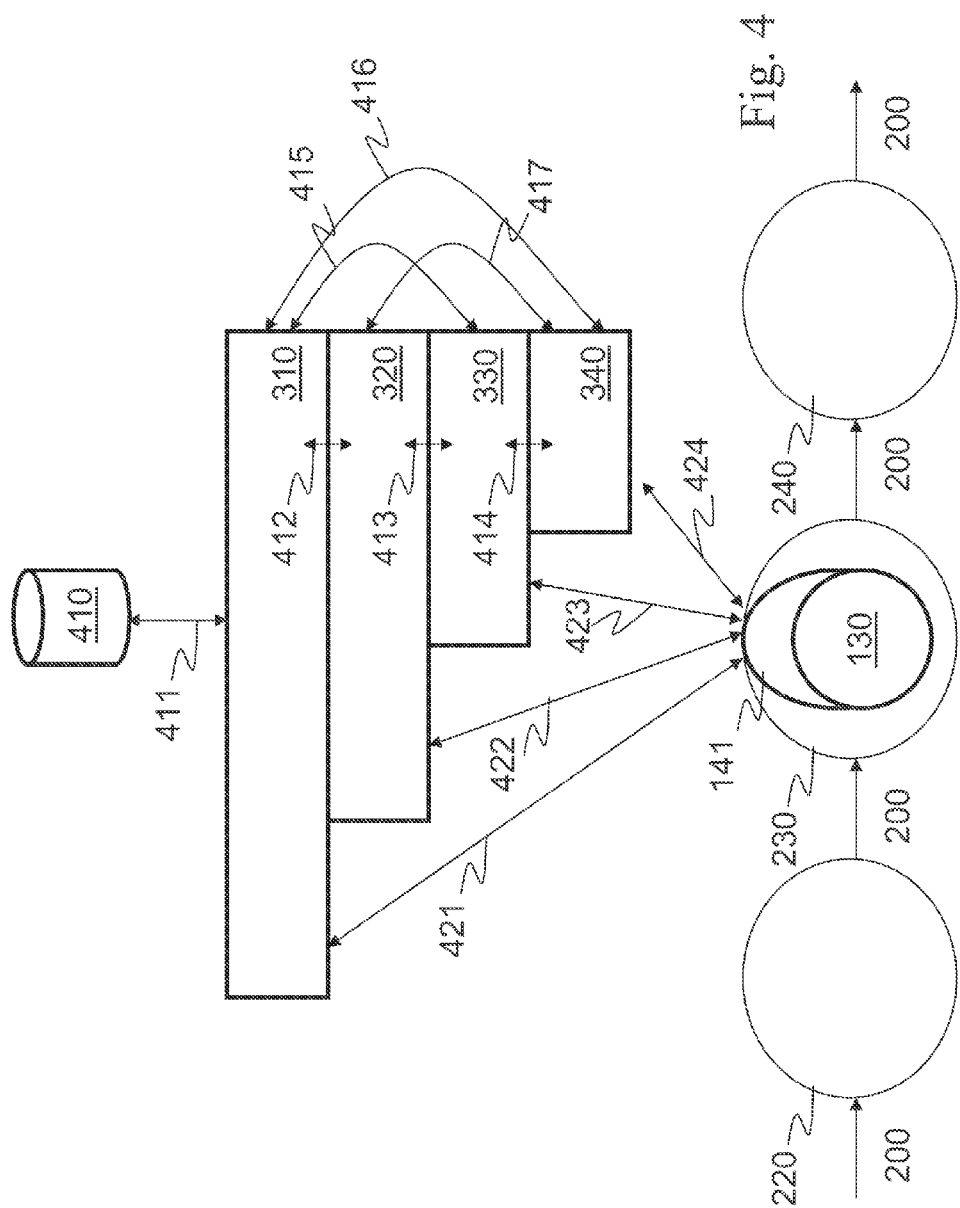
FIG. 4 presents another block diagram of a framework according to an embodiment of the invention.

FIG. 4 presents an example of a structure how the different layers and modules are interfaced with each other's. The real-time mediation concept is based on a continuous flow 200 of event records through the system. The records to be processed need different operations depending on the purposes of the records. For the requirements of quick and efficient operability, the records are stored in a place where the store and retrieve of records are quickly done, e.g. an in-memory database 410.

In some cases very rough or general operations are enough. These operations are done with database interface layer 310 or basic functionality layer 320 operations. In these cases there are not any specialised function needed. This also relives resources for the system, because in these cases only couple of layers and interfaces are needed.

According to an embodiment of the invention, interfaces used for above mentioned general operations are interfaces 411 and 421, or interfaces 411, 412 and 422.

In generic aggregation scenarios 331 the mediation functionality layer 330 is needed. In these cases the processing goes through several interfaces (411, 412, 413 and 423) and layers (310, 320 and 330).

Furthermore in specialised mediation functions 341 such as long duration call combining, the operation uses the highest mediation functionality layer 340. Although the need of different interfaces increases, but the function itself has very particular oriented task. In these cases the processing goes through several interfaces (411, 412, 413, 414, 424) and layers (310, 320, 330, 340) before the storage, in-memory database 410.

In an embodiment, wherein the processing logic 141 can use directly the interfaces 412, 413 and 414, there is no need for the interfaces 421, 422 and 423. In this case, the arrows in FIG. 4 corresponding to the reference numbers 421, 422 and 423 can be interpreted as possible communication links between the processing logic 141 and the corresponding modules.

In an embodiment, wherein the modules at layer 340 can use directly the interfaces 412 and 413, there is no need for the interfaces 416 and 417. In this case, the arrows in FIG. 4 corresponding to the reference numbers 416 and 417 can be interpreted as possible communication links between the module at layer 340 and the corresponding modules at layers 310 and 320.

In an embodiment, wherein the modules at layer 330 can use directly the interface 412, there is no need for the interfaces 415. In this case, the arrow in FIG. 4 corresponding to the reference numbers 415 can be interpreted as a possible communication link between the module at layer 330 and the module at layer 310.

In a preferred embodiment, each of the modules at layers 310-340 include two interfaces: one for communicating in the "lower" direction and one for communicating in the "higher" direction. For example, in a preferred embodiment, each module at layer 310 includes two interfaces, namely the interfaces 411 and 412. In a corresponding manner, the modules at layer 320 have interfaces 412 and 413 and the modules at layer 330 have interfaces 413 and 414. Of course, there may well be good reasons in some applications to provide a module with a third interface or even have four, five or more interfaces.

An Example of Using an Embodiment of the Invention

Figure 5:
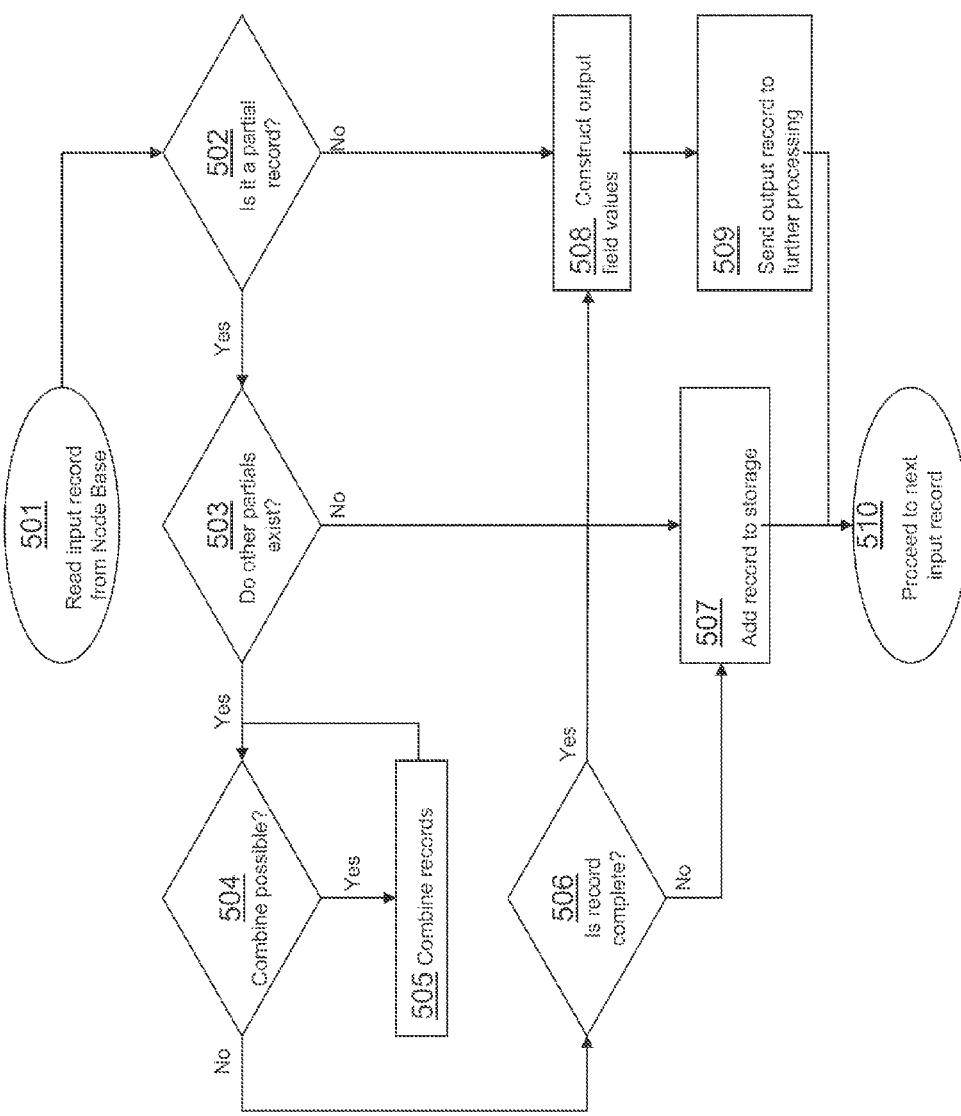
FIG. 5 presents a flow diagram of an example of one subsystem function according to an embodiment of the invention.

FIG. 5 presents an example of using an embodiment of the invention in combing long duration calls. A long duration call means that a call generates two or more partial CDRs or ERs. Before the call can be rated, billed and/or charged the total amount of time, volume, duration or other level of usage must be summarized. This is done in a long call combing function.

Aggregator (i.e. the subsystem, which executes aggregation function) is responsible for creating summary records of sessions or calls according to predefined aggregation rules called aggregation schemes. The aggregation function is designed to be a part of a processing logic node.

Long call combining is a specific case of aggregation, because it has clearly defined rules when two partial records (partials) may or may not be aggregated together and when the event becomes complete. The purpose of long call combining is to aggregate all partials that belong to the same long call in order to provide only one single record to the billing system.

Processing logic receives an input record from Node Base 501.

Processing logic 141 inserts the record for aggregation 502 using functions provided by the aggregation 331 and aggregation scheme layers 341.

Aggregation layer checks 503 for other records belonging to the same long duration call using the multi-layer temporary record storage (2) layer 321.

In case records are available to be combined 504, records are combined 505 according to the rules of the aggregation scheme 341:
- Partials are of same record type
- Both of the partials have the same unique ID (event identification)
- Partials are consecutive on either the sequence number or the time information.
- The first partial in sequence (based on time or sequence number) is not of type "last"
- The last partial in sequence (based on time or sequence number) is not of type "first"

If no combining is done, Aggregator stores 507 the newly arrived partial using the multi-layer temporary record storage (2) layer 321. Processing continues with the next input record 510.

A partial record combine 505 means that the following aggregation functions are applied (on certain configured fields):
- Sum. Values from the combined records are summarized
- MM. Value is taken from the smaller value
- Max. Value is taken from the larger value
- First and FirstPresent. Value is taken from the chronologically first partial where the field is present.
- Last and LastPresent. Value is taken from the chronologically last partial where the field is present.
- Concatenate. Values are concatenated.

If a combine is done 506 and the record does not become "complete" 507, the Aggregator tries to do further combines with the other records in the in-memory database 410.

When a combined long duration call is complete the aggregation layer retrieves 508 the record and returns 509 it to the processing logic.

Processing logic 141 applies necessary modifications to the combined record and forwards the record to the Node Base 130, which makes the record available for the next node in the processing stream 200.

Processing continues to the next input record 510.

In addition to the above-described process, the following also takes place:
- At regular configured intervals, the Aggregation layer scans the in-memory database 410 in order to flush expired records
- Expired records are partials or partially combined long calls where one or several partials are missing.
- In order to get all records out from the Aggregator in a timely fashion, "old" records are flushed out.

Another Example of Using an Embodiment of the Invention

Another example is a method for processing at least potentially related event records in a communications network by means of a mediation system described above. In this example, the at least potentially related event records comprise a first record and a last record and optionally at least one intermediate record. Then, the following steps can be performed by means of the system of FIGS. 3 and 4.

When the first of the at least potentially related event records is input to the node 230, the processing logic 141 receives the record. The processing logic 141 selects a process for processing the first record and the potentially related last and intermediate event records, if any. The selected process may be, for instance, an aggregation process, a correlation process, a duplicate checking process or a sequence checking process.

The method is continued according to the selected process by performing the steps of:
- extracting information from the received first record,
- selecting a module at the database interface layer, basic functionality layer or mediation functionality layer, and
- sending the extracted information to the module for performing a function and for storing into the in-memory database.

The extracted information may contain the whole information in the event record of any part thereof. Usually, only the information that is, or might be, of relevance in the selected process is extracted. However, there may be good reasons for extracting also some other information from the record.

In case there are intermediate record or records, the method may comprise, for example, the steps of:
- receiving the intermediate record at the processing logic 141, and according to the selected process:
  - extracting information from the intermediate record,
  - selecting the module at the database interface layer, basic functionality layer or mediation functionality layer, and
  - sending the extracted information to the module for performing a function.

The function may comprise, for example, the steps of:
- retrieving information relating to the first record from the in-memory database 410,
- creating a new record based on the function and the retrieved and extracted information, and
- storing the information of the new record into the in-memory database to take place of the information of the first record.

Another possibility for the performed function is that it comprises, for example, the steps of:

retrieving information relating to the first record and any earlier intermediate record from the in-memory database 410, checking whether there are consecutive records in the group of the first and intermediate records, in case of consecutive records, combining the information from the consecutive records, and storing the combined information into the in-memory database to take place of the information from the consecutive records, and maintaining the information of the non-consecutive records in the in-memory database.

A further possibility for the function performed on the information from an intermediate record is to store the information about the intermediate record into the in-memory database.

When the last of the related records arrives the node, the processing logic 141 receives the last record and notices that a process has already been selected for the record in connection with the processing of the first record. Then, the processing is continued according to the selected process, in this example by performing the following steps:

extracting information from the last record, selecting the module at the database interface layer, basic functionality layer or mediation functionality layer, and performing a function, wherein the function comprises:

retrieving from the in-memory database information relating to the first and any intermediate records, and creating a new record based on the function and the retrieved and extracted information, and returning the new record to the processing logic 141.

After these steps, the processing logic 141 may send the new record to the node base 130 for transmittal to the next node 240. This is in case there are no further processes that have to be performed in the node 230 for the particular event record. In an alternative case, the processing logic 141 sends the created new record for a further process within the same node 230. Hence, the same event records, or the data derived from the records, may go through several processes in the node 230 and in the same subsystem. For example, same received event records may be checked for duplicates, aggregated and correlated in the same subsystem 300. Then, several modules 331-335 and 341-346 are used for processing the information that is extracted from the same records.

A Further Example of Using an Embodiment of the Invention

A further example of using an embodiment of the invention is a location-based service for subscribers. In this case an operator gives location-based services to subscribers where the coordinates (latitude/longitude) is fetched from an external database or other source (not shown). First the subscriber's reference information (i.e. the location) is checked from the external source via the In-memory database 410 with aid of the database interface layer 310 (SQL). If the reference information is valid it is added (i.e. enriched) to the event record under process. After the enrichment the actual operation is going to be done, which in this case is aggregation. Naturally this is an example and the purpose of use of the invention is almost limitless.

The above description is only to exemplify the invention and is not intended to limit the scope of protection offered by the claims. The claims are also intended to cover the equivalents thereof and not to be construed literally.

The invention claimed is:

1. A mediation system for processing event records that are configured to have a mutual relation, the system comprising: at least two independent node components, each of the independent node components having settings according to which the node component operates independently of other components of the system, the at least two independent node components being configured to handle event records in series such that a first independent node component outputs event record data into a buffer and a second independent node component reads the event record data from the buffer, the event records comprising a first record, at least one intermediate record, and a last record;

at least one host, the at least one host including a processor and a memory and being configured to execute the at least two independent node components for processing the event records;

an in-memory database configured to store data on the event records and configured to store said mutual relation, wherein at least one of the at least two independent node components comprises a subsystem including:

a database interface layer comprising a module providing an interface to the in-memory database, a basic functionality layer comprising at least one module configured to perform basic functions on the data in the in-memory database via the module at the database interface layer, and a mediation functionality layer comprising at least two modules each configured to perform at least one mediation function on the data in the in-memory database selectively either via the modules at both the database interface layer and the basic functionality layer or directly via the modules at the database interface layer; and the mediation system further comprising processing logic structured to operate the subsystem to receive the first record and the last record and to select a process for processing the first record and the last record, the selected process configured to:

extract information from the first record, select a module at the database interface layer, basic functionality layer, or mediation functionality layer, for processing the information extracted from the first record, send the information extracted from the first record to the selected module for performing a function on the information extracted from the first record and for storing into the in-memory database, extract information from the last record, retrieve from the in-memory database information relating to the first record and any intermediate records, create a new record based on the function and the retrieved information relating to the first record and any intermediate records, and return the new record to the processing logic.

2. The system according to claim 1, wherein the data stored on an event record that is in the in-memory database comprises at least one of: identification of the event record, the whole event record, a part of the event record, data extracted from the event record and modified data from the event record.

3. The system according to claim 1, wherein said mediation functionality layer comprises at least two layers.

4. The system according to claim 1, wherein said system is configured to process event records as a stream.

5. The system according to claim 1, wherein each module at the basic functionality layer comprises a first interface for interfacing with the module at the database interface layer and at least one second interface for interfacing with the modules at the mediation functionality layer.

6. The system according to claim 5, wherein the mediation functionality layer comprises at least two modules comprising first interfaces for interfacing with a module at the basic functionality layer and second interfaces for interfacing with either another modules at the mediation functionality layer or with the mediation system elements outside the subsystem or both.

7. The system according to claim 5, wherein the mediation functionality layer comprises at least one module configured to communicate directly with the module at the database interface layer.

8. The system according to claim 1, wherein at least two layers selected from the group of the database interface layer, basic functionality layer and mediation functionality layer are configured to communicate directly with a mediation system element outside the subsystem.

9. The system according to claim 1, wherein the mediation functions include at least one of: aggregation, correlation, duplicate checking, sequence checking and lookup.

10. The mediation system according to claim 1, wherein each of the at least two independent node components includes a node base providing basic functionality and an application, the application including the subsystem and the processing logic.

11. The mediation system according to claim 1, wherein the system is configured to handle event records in a communications network between a generation layer of events and an operation system layer of events and wherein the mediation system further comprises:
at least one node manager component for configuring the node components, starting up the node components, monitoring the functioning of the node components and stopping the node components, when required, and
a system database for managing all configuration information of each component and for storing information on handled events.

12. The mediation system according to claim 11, wherein each of the node components comprise a node base providing basic functionality of the node component and an application containing processing rules, according to which the node component processes the event records input to the node component.

13. The mediation system according to claim 12, wherein the processing logic configured to operate the subsystem is in the application comprising the subsystem.

14. The system according to claim 1, wherein said mediation functionality layer comprises at least two layers, including a mediation functionality layer including generic functionality modules and a specialized mediation functionality layer including specialized functionality modules.

15. A method for processing event records capable of being related, in a communications network by means of a mediation system including at least two independent node components, each of the independent node components having settings according to which the node component operates independently of other components of the mediation system, the at least two independent node components being configured to handle event records in series such that a first independent node component outputs event record data into a buffer and a second independent node component reads the event record data from the buffer; at least one host including a processor and a memory and being configured to execute the at least two independent node components for processing the event records; an in-memory database configured to store data on the event records and configured to store said mutual relation, wherein at least one of the at least two independent node components comprises a subsystem including a database interface layer comprising a module providing an interface to the in-memory database, a basic functionality layer comprising at least one module configured to perform basic functions on the data in the in-memory database via the module at the database interface layer, and a mediation functionality layer comprising at least two modules each configured to perform at least one mediation function on the data in the in-memory database selectively either via the modules at both the database interface layer and the basic functionality layer or directly via the modules at the database interface layer; and processing logic structured to operate the subsystem, the method comprising:
receiving the first record at the processing logic,
selecting a process for processing the first record and the last record, and according to the selected process:
extracting information from the first record,
selecting a module at the database interface layer, basic functionality layer or mediation functionality layer, and
sending the extracted information to the module for performing a function and for storing into the in-memory database,
receiving the last record at the processing logic, and according to the selected process:
extracting information from the last record,
selecting the module at the database interface layer, basic functionality layer or mediation functionality layer,
retrieving from the in-memory database information relating to the first and any intermediate records, and
creating a new record based on the function and the retrieved and extracted information, and
returning the new record to the processing logic.

16. The method according to claim 15, further comprising processing event records as a stream.

17. The method according to claim 15, comprising performing mediation functions on the event records, wherein the mediation functions comprise at least one of: aggregation, correlation, duplicate checking, sequence checking and lookup.

18. The method according to claim 15, wherein the event records comprise a first partial record and a last partial record and optionally at least one intermediate partial record, and the method comprises the steps of:
receiving and reading an event record,
performing a check whether the read event record is a partial record, and
continuing the method according to the result of the performed check.

19. The method according to claim 18, wherein, in case the performed check indicates that the record is not a partial record, the step of continuing the method comprises the steps of:
constructing an output record, and
sending the output record to further processing.

20. The method according to claim 18, wherein in case the performed check indicates that the record is a partial record, the step of continuing the method comprises the steps of:
performing a check whether another partial record having a relation to the read partial record has already been received, and
if such another partial record has not been received, adding the read partial record to a database, if such another partial record has already been received, checking if the related partial records can be combined (504).

21. The method according to claim 20, wherein if the related partial records are combinable, the method comprises combining the partial records and returning to the step of checking could the related partial records be combined.

22. The method according to claim 20, wherein if the related partial records are not combinable, the method comprises:
checking whether each of the first partial record, last partial record and any intermediate partial record has been received and combined, and
if the combined record is not complete, adding the read partial record to the database,
if the combined record is complete, constructing an output record and sending the output record to further processing.

23. The method according to claim 15, further including processing an intermediate record, the method of processing an intermediate record comprising:
receiving the intermediate record at the processing logic, and according to the selected process:
extracting information from the intermediate record,
selecting the module at the database interface layer, basic functionality layer or mediation functionality layer,
sending the extracted information to the module;
retrieving from the in-memory database information relating to the first record,
creating a new record based on the function and the retrieved and extracted information, and
storing the information of the new record into the in-memory database to take place of the information of the first record.

24. The method according to claim 15, further including processing an intermediate record, the method of processing an intermediate record comprising:
receiving the intermediate record at the processing logic, and according to the selected process:
extracting information from the intermediate record,
selecting the module at the database interface layer, basic functionality layer or mediation functionality layer, and
sending the extracted information to the module;
retrieving from the in-memory database information relating to the first record and any earlier intermediate record,
checking whether there are consecutive records in the group of the first and intermediate records,
in case of consecutive records, combining the information from the consecutive records, and storing the combined information into the in-memory database to take place of the information from the consecutive records, and
maintaining the information of the non-consecutive records in the in-memory database.

25. The method according to claim 15, further including processing an intermediate record, the method of processing an intermediate record comprising:
receiving the intermediate record at the processing logic, and according to the selected process:
extracting information from the intermediate record,
selecting the module at the database interface layer, basic functionality layer or mediation functionality layer,
sending the extracted information to the module, and
storing information about the intermediate record into the in-memory database.

26. The method according to claim 15, wherein the information extracted from the event record comprises at least one of: identification of the event record, the whole event record, a part of the event record and a value of a data field in the event record.

27. The method according to claim 15, wherein a module at the mediation functionality layer sends information on the event records selectively to a module at the basic functionality layer or to a module at the database interface layer.

28. The method according to claim 15, wherein the processing logic selects first a first process and a first module for processing the received event record and then at least one second process and module for processing the same received event record.

29. A computer program product comprising a non-transitory computer readable medium having stored therein processing instructions executable by a computer system to implement a method for processing event records that are configured to have a mutual relation, the method comprising:
configuring at least two independent node components to handle event records in series such that a first independent node component outputs event record data into a buffer and a second independent node component reads the event record data from the buffer, each of the independent node components having settings according to which the node component operates independently of other components of the system, wherein at least one of the at least two independent node components comprises a subsystem configured for:
storing data on the event records and said relation in an in-memory database,
providing an interface to the in-memory database with an database interface layer module,
performing basic functions on the data in the in-memory database via the database interface layer module with a basic functionality layer module, and
performing at least one mediation function on the data in the in-memory database with a mediation functionality layer comprising at least two modules, each module configured to perform at least one mediation function on the data in the in-memory database selectively either via both the database interface layer module and the basic functionality layer module or directly via the database interface layer module;
receiving the first record at the processing logic;
selecting a process for processing the first record and the last record, and according to the selected process:
extracting information from the first record,
selecting a module at the database interface layer, basic functionality layer or mediation functionality layer, and
sending the extracted information to the module for performing a function and for storing into the in-memory database,
receiving the last record at the processing logic, and according to the selected process:
extracting information from the last record,
selecting the module at the database interface layer, basic functionality layer or mediation functionality layer,
retrieving from the in-memory database information relating to the first and any intermediate records,
creating a new record based on the function and the retrieved and extracted information, and
returning the new record to the processing logic.

30. A method for processing event records capable of being related, the method comprising:
receiving an event record from a telecommunications network with a mediation system, the mediation system comprising a physical system, an in-memory database, and at least two independent node components configured to handle event records in series such that a first independent node component outputs event record data into a buffer and a second independent node component reads the event record data from the buffer, and wherein at least one of the at least two independent node components comprises a subsystem including a database interface layer, a basic functionality layer, and a mediation functionality layer, the database interface layer comprising a database interface module providing an interface to the in-memory database, the basic functionality layer comprising a basic functionality module configured to perform basic functions on the data in the in-memory database via the database interface module, and the mediation functionality layer comprising a mediation functionality module configured to perform at least one mediation function;

receiving the first record at the processing logic;

selecting a process for processing the first record and the last record, and according to the selected process:
  extracting information from the first record,
    selecting a module at the database interface layer, basic functionality layer or mediation functionality layer, and
    sending the extracted information to the module for performing a function and for storing into the in-memory database;
  by the mediation functionality module,
    performing a check whether the event record is a partial record;
    if the record is not a partial record, constructing an output record;
    if the record is a partial record, performing a check whether a related partial record has already been received, and if such related partial record has not been received, adding the partial record to the in-memory database, and if such related partial record has already been received, checking if the partial record and the related partial record can be combined; and receiving the last record at the processing logic, and according to the selected process:
  extracting information from the last record,
  selecting the module at the database interface layer, basic functionality layer or mediation functionality layer,
  retrieving from the in-memory database information relating to the first and any intermediate records, and
  creating a new record based on the function and the retrieved and extracted information; and
  returning the new record to the processing logic.

31. The method according to claim 30, further comprising:
combining the partial record and the related partial record;
determining if the combined record is complete;
if the combined record is not complete, adding the partial record to the database; and
if the combined record is complete, constructing an output record.

* * * * *